F. E. YOUNG.
GRINDING MILL.
APPLICATION FILED DEC. 27, 1915.
1,210,251.
Patented Dec. 26, 1916.
3 SHEETS—SHEET 1.
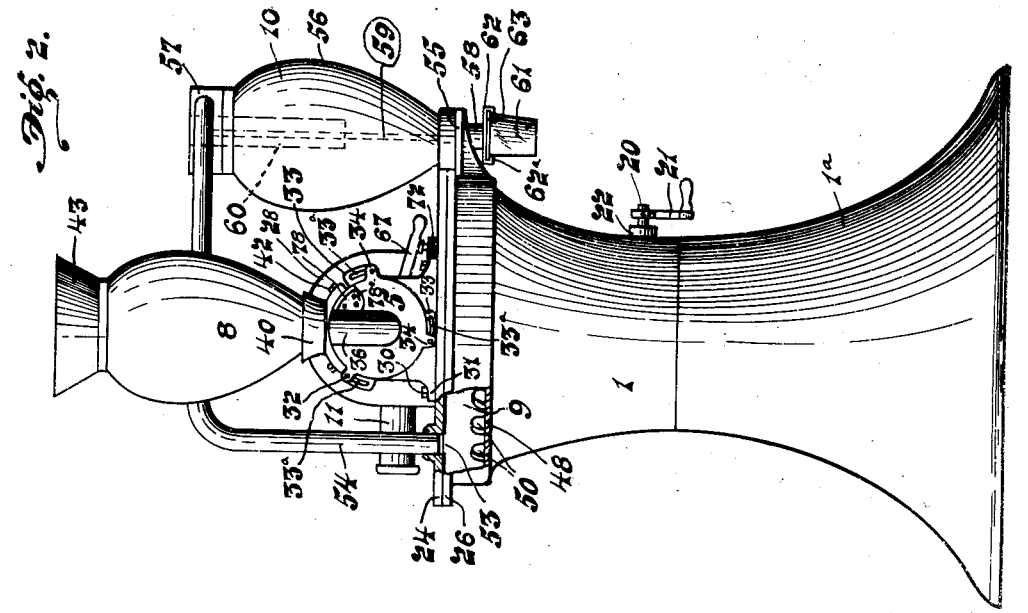
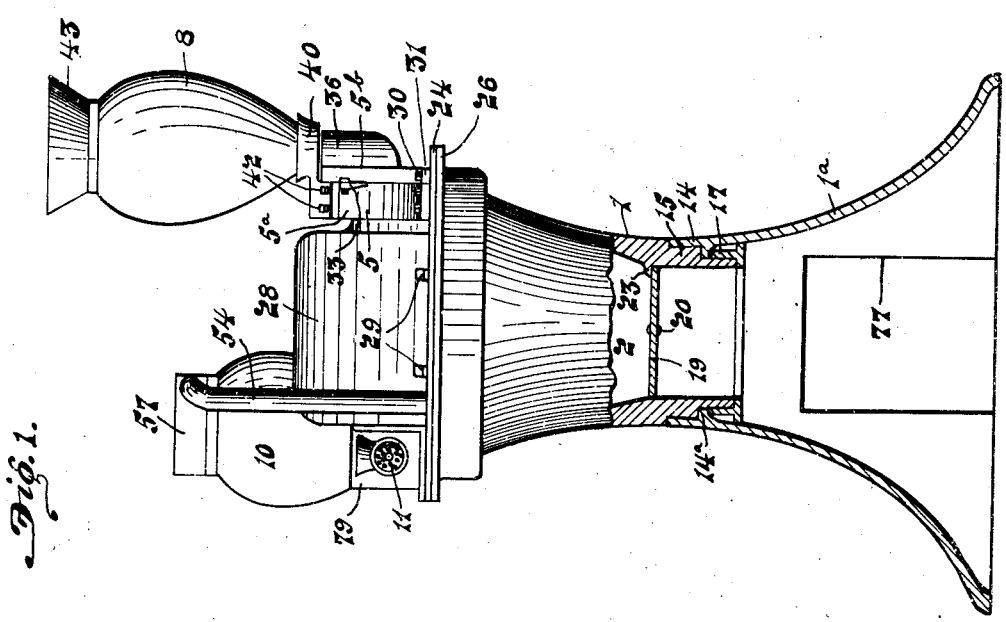
Witness
Robert O. Karcher.
Inventor
Frank E. Young.
By Harry Frease
Attorney.

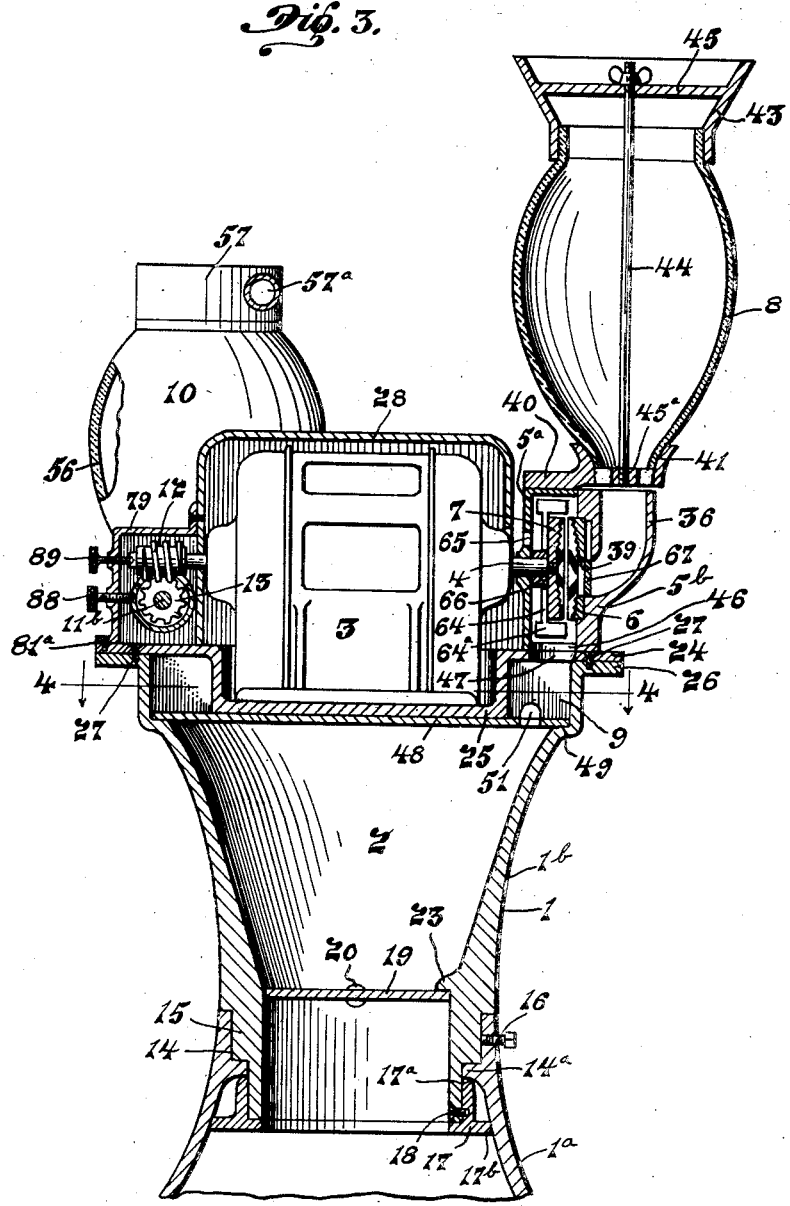

F. E. YOUNG.
GRINDING MILL.
APPLICATION FILED DEC. 27, 1915.
1,210,251.
Patented Dec. 26, 1916.
3 SHEETS—SHEET 3.
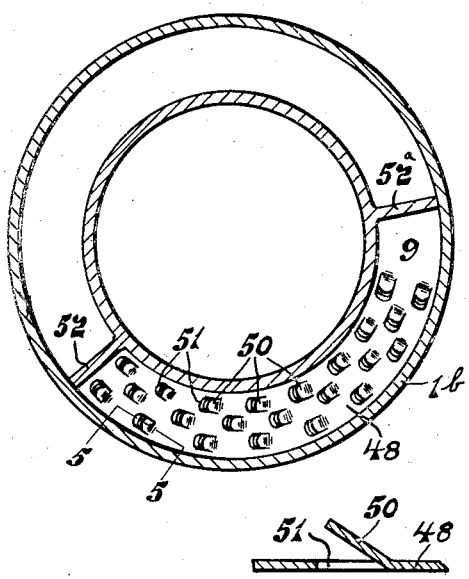
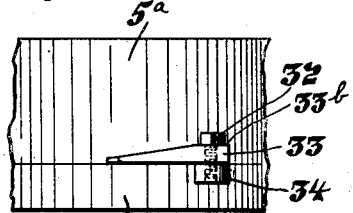
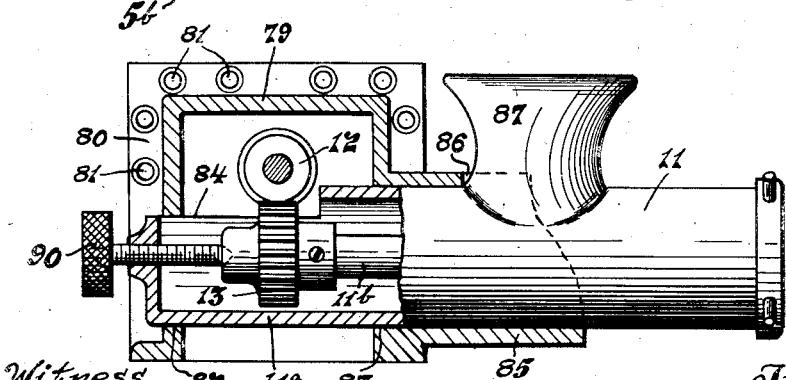
Inventor
Frank E. Young.

UNITED STATES PATENT OFFICE.

FRANK E. YOUNG, OF CANTON, OHIO.

GRINDING-MILL.

1,210,251.   Specification of Letters Patent.   Patented Dec. 26, 1916.

Application filed December 27, 1915. Serial No. 68,644.

*To all whom it may concern:*

Be it known that I, FRANK E. YOUNG, a citizen of the United States, residing at Canton, in the county of Stark and State of Ohio, have invented certain new and useful Improvements in Grinding-Mills, of which the following is a specification.

The invention relates to improvements in grinding mills and more particularly to a mill for grinding coffee or the like combined with a food grinder, wherein the grinding elements are mounted in suitable casings upon a base and operatively connected with a motor driven shaft, there being a feed hopper and receiving chamber communicating with the case of the coffee grinding element; and the objects of the invention are to provide means for separating chaff, dust, or other similar refuse, from the coffee after it is ground, and for collecting the refuse; to provide means for automatically controlling the admission of coffee into the coffee grinding element as the motor energizing circuit is closed or opened, and for automatically opening the motor circuit to stop the motor when the coffee grinding operation is completed; to provide an automatic release for the stationary bur of the coffee grinding element perchance a hard and unyielding foreign substance should be fed into the machine and engaged by the burs; and to provide an improved gearing connection between the food grinder driving shaft and motor shaft.

The objects of the invention thus set forth in general terms, together with various other incidental objects, may be attained by the construction and arrangement illustrated in the accompanying drawings forming part hereof, in which—

Figure 1 is a side elevation of the grinding mill, the lower portion thereof being in section to show the construction of the ground coffee receiving chamber; Fig. 2, a front elevation of the mill, the upper portion of the base section being partly in section to show a part of the coffee separating chamber; Fig. 3, a fragmentary central sectional view of the mill, the motor being shown in side elevation; Fig. 4, a sectional view of the coffee separating chamber on line 4—4, Fig. 3; Fig. 5, a fragmentary sectional detail view of one of the chaff deflecting surfaces, on line 5—5, Fig. 4; Fig. 6, a detached perspective view of the outer face plate or head of the bur case; Fig. 7, a fragmentary elevation section of the bur case head, automatic coffee feed valve and motor switch; Fig. 8, a fragmentary plan view partly in section, illustrating the manner of connecting the upper face plate to the bur case for the automatic bur release; and Fig. 9 a detached sectional view of the food grinder housing, a portion of the grinder being in side elevation.

Similar numerals refer to similar parts throughout the drawings.

The grinding mill includes a base 1 having a coffee receiving chamber 2 therein, a motor 3 mounted on the base having a main driving shaft 4 extending therethrough; a bur case 5, into which the main shaft extends, having a stationary bur 6 mounted therein and a rotary bur 7 fixed to the shaft 4; a feed hopper 8 mounted on the bur case and communicating therewith; a coffee separating chamber 9 in the upper portion of the base communicating with the bur case 5 and the coffee receiving chamber 2; and a dust or chaff collector 10 mounted on the base and communicating with the coffee separating chamber 9; and on the side of the base opposite from that carrying the coffee grinding means, is supported a food grinder 11 of any well known construction operatively connected to the main shaft 4 by means of a worm gear 12 thereon and a pinion 13 carried by the grinder shaft $11^b$.

The base 1 of the grinding mill comprises a lower or bottom section $1^a$ having a bearing 14 on its upper or top end and an upper section $1^b$ having a bearing 15 on its lower end adapted to fit within the section $1^a$ and engage with the bearing 14. The upper section is thus swiveled upon the lower section, and a set screw 16 is provided on the lower section for locking the upper section from rotation thereon.

In order to prevent the disengagement of the two sections, and to provide means for resisting lateral strains, an annular bearing bracket 17 is attached to the lower end of the upper section, after the sections have been assembled, as by means of screws 18, the upper edge $17^a$ of said bracket bearing against the lower surface of an annular flange $14^a$ forming part of the bearing 14, and the outer edge $17^b$ bearing against the inner side of the lower base section.

The lower end of the upper section $1^b$ of the base is normally closed by means of a suitable valve in order to form the coffee receiving chamber 2 therein; which valve may be in the form of a butterfly valve 19 pivotally mounted in the section 1$^b$ by means of a pivot pin 20 and adapted to be swung by means of a crank arm 21 mounted on one end of the pivot pin 20 extending through and operating in a bearing 22 formed in the side of the case; a stop lug 23 being provided on the inner side of the upper section 1$^b$ near the lower end thereof against which the upper edge of the valve is adapted to bear when the receiving chamber is closed.

The upper end of the base 1 is closed by means of a base plate 24 having a central depression or recess 25 therein for receiving the motor 3, the upper end of the base being provided with an annular external flange 26, to which the base plate 24 is secured, as by means of screws 27; and the motor 3 is preferably inclosed by means of a hood or cover 28 adapted to rest upon the base plate 24 to which it is suitably secured as by means of angle irons 29.

The main shaft 4 which extends through the motor and is mounted to bear in the motor case in a well known manner, extends through the hood 28 at each end thereof and at one end carries the worm gear 12 which meshes with the pinion 13 on the counter driving shaft for the food grinder 11, and at its other end extends into the bur case 5 and has fixed thereon, the rotary coffee grinding bur 7.

The bur case 5 comprises a cylindrical case section 5$^a$ mounted uprightly upon the base plate 24, and a face plate or head 5$^b$ detachably secured to the section 5$^a$. The section 5$^a$ is secured to the base plate by means of bolts 30 entered through feet 31 formed on the lower side of the case; and the head 5$^b$ is secured to the section 5$^a$ by means of bolts 32 entered through slotted ears 33 on the base section and threaded into lugs 34 on the head.

The inner surface of the head 5$^b$ is provided with a recess 35 adapted to receive the stationary grinding bur 6, and the outer surface of the head 5$^b$ has formed on its upper portion, a semi-cylindrical passageway or channel 36 extending radially from an opening 37 in the center of the head to the upper edge of the case 5$^a$. The bur 6 with which the rotary bur 7 coöperates during the grinding operation, is secured from rotation in the recess 35 of the head as by means of screws entered in the apertures 38 in the lower portion thereof, and is provided with an opening 39 registering with the opening 37 in the head for communication with the channel 36

The feed hooper 8, which may be of any suitable size and shape, is preferably formed of glass and is mounted upon the case section 5$^a$ of the bur case by means of a bracket 40 having an opening 41 therein registering with the upper end of the channel 36 through which openings the coffee is fed into the bur case to be ground. The bracket 40 is secured to the bur case by means of screws or bolts 42, and the hopper 8 is clamped between the bracket and a funnel 43 on the upper end of the hopper by means of a tie-rod 44 entered through a spider 45 provided in the mouth of the funnel, and screw-threaded into a spider 45$^a$ provided in the opening 41 in the bracket.

The lower side of the section 5$^a$ of the bur case is provided with an opening 46 which registers with a similar inlet opening 47 provided in the base plate 24, through which openings ground coffee is discharged from the bur case into the separating chamber 9 in the upper portion of the base 1. The separating chamber 9 is rectangular in cross section and extends substantially from one side of the base to the other along the upper edge thereof, the upper and inner side walls of the chamber being formed by the base plate 24, the outer wall by the base section 1$^b$ and the bottom wall by a circular plate 48 supported by shoulders 49 formed near the upper end of the base section 1$^b$. The portion of the plate 48 forming the bottom wall of the separating chamber is provided with a plurality of deflectors 50 and perforations 51 formed by striking up lugs from the body of the plate. As shown in Figs. 4 and 5, these deflectors and perforations are arranged in staggered relationship, the deflectors being inclined at an angle of substantially 45° in the direction of movement of the ground coffee, whereby when the coffee and chaff is carried into the separating chamber in the operation of the mill, the chaff will be deflected upwardly and the coffee will readily find its way through the perforations into the coffee receiving chamber 2.

The ends of the separating chamber 9 are closed by ribs or vanes 52 and 52$^a$ perferably formed integral with the base plate 24 substantially diametrically opposite each other, and the end of the separating chamber opposite from the inlet end thereof is provided with an outlet opening 53 which communicates by means of a conductor pipe 54 with the collector 10 mounted upon a bracket 55 formed integral with the base 1.

The collector 10 is preferably of the well known type known as a "cyclone" collector, in which the current of dust laden air is introduced tangentially into the upper end of a conical chamber, and in the present instance, comprises a chamber 56 preferably formed of glass, and having a cylindrical cap 57 on its upper end and a discharge tube 58 on its lower end; said chamber being clamped between the bracket 55 and cap 57 by means of a tie-rod 59, in the manner above set forth for securing the coffee hopper 8 upon its supporting bracket 40. The cap 57 is provided with an opening 57ª in its periphery adapted to receive the upper end of the conductor pipe 54 substantially at a tangent thereto, and with an exhaust tube 60 depending a substantial distance below the opening 57ª in the cap; and the discharge tube 58 is provided on its lower end with a removable cup or receptacle 61 which may be secured to the tube as by means of a plate 62 fixed thereto and having a hooked flange 62ª adapted to receive an external flange 63 on the cup.

Means are provided for creating a blast for separating the chaff from the ground coffee, consisting of a fan wheel suitably mounted on the motor shaft within the bur case, a plurality of air inlet openings 65 being provided in the section 5ª of the bur case near the center thereof. The fan wheel consists of a plurality of fan blades 64 mounted adjacent the rotary bur upon a hub 66 fixed on the motor shaft 4, and their outer ends preferably extend beyond the periphery of the bur and are widened to form vanes 64ª.

Communication between the opening 39 in the stationary bur 6 and the opening 37 in the head 5ᵇ is controlled by means of a lever arm 67 forming a slide valve therebetween, and the opening and closing of the motor energizing circuit is also controlled by the arm 67, the parts being so arranged that when the arm is raised from its normal position, the circuit is closed to start the motor, and upon a further raising of the arm, the openings 37 and 39 are uncovered and coffee is admitted into the bur case; and when the lever is returned to its normal position, the openings will be closed, the flow of coffee shut off, and the motor circuit opened.

The lever arm 67 is pivoted to the inner face of the head 5ᵇ near one edge thereof as by means of a pivot screw entered through an aperture 68 therein, and the edge of the head opposite said pivot screw, is provided with an elongated substantially semi-circular slot 69, extending from near the upper edge of the head to near the lower edge thereof, in which slot the lever arm is adapted to operate. The inner face of the head may be provided with a recess 70 in which the arm 67 is adapted to freely operate, said recess being in the form of a V-notch and slightly shallower than the thickness of the lever arm, the edges of which recess converge from the ends of the slot 69 to a point near the opposite edge of the head.

Near the free end of the lever arm 67 is provided a shoe 71 preferably formed integral therewith, and mounted upon the base plate 24 immediately below the lever arm is an electric spring switch 72 having a push pin 73 projecting upwardly through a switch block 74 and mounted upon a spring contact piece 75 secured on the under side of the switch block. The contact piece 75 normally engages with a second contact piece 76 also mounted on the under side of the switch block to close the energizing circuit of the motor within which the switch is inserted in a well known manner. The upper end of the push pin 73 is adapted to be engaged by the shoe 71 on the lever arm, and the parts are so proportioned and arranged that when the lever rests upon the push pin the circuit will be opened and the motor brought to rest, and conversely, when the lever is raised, the circuit will be closed and the motor started. In the operation of the lever arm to close the circuit and admit coffee into the bur case, it is very desirable if not necessary, that the lever arm be raised slowly so that before the coffee is admitted between the grinding burs, the motor will have acquired sufficient momentum for the grinding operation.

Means are provided for automatically maintaining the lever arm in raised position during the grinding operation, and for releasing the lever to open the switch 72 and stop the machine when the coffee has been ground; and for this purpose the stationary bur 6 is so secured within the head 5ᵇ by the retaining screws entered in the apertures 38 in the lower portion of the head as to have a slightly lateral swinging movement at its upper portion. It will thus be seen that when coffee is admitted between the burs, by reason of the pressure exerted thereby against the burs, the bur 6 will bind the lever arm between it and the head, and when the coffee has been ground and discharged from between the burs, the lever will be permitted to drop down upon the motor switch and open the circuit to stop the motor.

In operation, the coffee to be ground, is placed in the hopper 8 and the lever arm 67 raised from its position on the motor switch to start the motor, whereupon the lever is given a further upward thrust to uncover the openings in the head 5ᵇ and the stationary bur 6, thus admitting coffee between the burs to be ground. The ground coffee discharging from the bur case 5 is then carried by the air blast created by the fan blades 64 of the fan wheel into the coffee separating chamber 9, the light particles of chaff and dust being deflected by the deflectors 56 in the bottom thereof, and carried by the air current into the collector 10, and the heavy particles of coffee falling by gravity through the perforations 51 in the plate into the coffee receiving chamber 2, said chamber being closed by the valve 19 to prevent the passage of air therethrough in either direction, thus forming a substantially dead air space into which the coffee which is separated from the chaff may fall. The chaff deflected by the deflectors 56 is carried into the collector 10 and then separated out in the well known manner, the air discharging upwardly through the exhaust tube 58 and the chaff collecting in the receptacle 61 in the lower end of the collector. While the coffee is being ground, it will be evident that the pressure of the stationary bur against the lever 67 will maintain it in raised position, and that as the last particle of coffee is discharged into the separating chamber, the lever will fall and automatically open the circuit to stop the motor. The coffee carton or other receptacle may then be placed within the base through an opening 77 therein, into which receptacle by the operation of the valve 19, by means of the crank 21, the ground coffee will be discharged.

It will thus be seen that means are provided not only for grinding the coffee as in the ordinary mill, but for separating the chaff and dust therefrom, and also for collecting the chaff and dust from the air thus avoiding much annoyance and nuisance ordinarily resulting therefrom; and by reason of the automatic valve and switch mechanism, a considerable saving in time and electricity is effected in addition to the material lessening of care and attention required by the attendant for each grinding operation. Furthermore the coffee hopper and chaff collector being formed of glass, the operation of the feeding and chaff collecting features of the mill may be readily observed, thus adding to the attractiveness of the machine.

The automatic bur releasing mechanism is provided for the purpose of preventing injury to the burs by a foreign substance, such as a nail accidentally fed into the machine and engaged by the burs, and consists of an automatically detachable connection between the bur case head 5$^b$ and section 5$^a$. As above set forth, the head 5$^b$ is secured to the section 5$^a$ by means of bolts 32 entered through ears 33 on the case section and screwthreaded into lugs 34 on the head. The ears 33 are provided with elongated slots 33$^a$, and as shown in Fig. 8, are substantially wedge-shaped, the inner side thereof being flush with the edge of the case section and the outer side being inclined inwardly from the heavy or head end toward the opposite end thereof. The head end of each of the ears is provided on its outer side with a flat bearing surface or boss 33$^b$, against which the heads of the bolt 32 are adapted to bear when the parts are in normal position, said bolts being sufficiently loose to permit a shifting movement of the head 5$^b$ with reference to the case section 5$^a$ to an extent equal to the length of the slot 33$^a$. With the rotary bur 7 rotating to the left, Fig. 2, a nail or the like fed into the machine and engaged by the burs will tend to bind them together, thus causing the bolts 32 to be disengaged from their seat upon the boss 33$^b$ and to travel to the opposite end of the slot 33$^a$, thus increasing the distance between the burs in proportion to the decrease in thickness of the ears.

Means are provided for closing the opening 41 in the bottom of the feed hopper 8, to shut off the flow of coffee when the head 5$^b$ is shifted during the bur releasing operation, such means comprising a slide plate 78 projecting outwardly from the outer face of the head 5$^b$ at one side of the channel 36 and adapted to lie immediately below the opening 41 after the head has been shifted. The upper surface of said plate is arched to lie flush with the edge of the head and is provided with a depending flange 78$^a$ by means of which the plate is secured to the head as by means of screws or the like. The head 5$^b$ is thus not only removably mounted upon the case section 5$^a$ of the bur case, whereby the grinding element is made conveniently accessible without removing the feed hopper, but a very simple and effective mechanism is provided for automatically releasing the stationary bur in order to prevent injury to the burs and enable the discharge of the foreign substance. Furthermore the releasing of the stationary bur will permit the lever arm 67 to drop down upon the switch to open the motor circuit and stop the motor, the shoe 71 on the arm being of sufficient width to contact the push pin 73 of the switch after it has been shifted with the head from its normal position during the bur releasing operation.

The means for mounting the food grinder 11 on the base, opposite the coffee grinding element comprises a housing 79 mounted upon the base plate 24 at the end of the motor hood 28, the inner and lower edges of said housing being provided with outwardly projecting flanges 80 having openings 81 therein through which screws 81$^a$ are entered for securing the housing to the base and hood. The housing 79 is provided in its opposite sides with openings 82 and 83 within which the case 11$^a$ of the food grinder may be inserted, the opening 82 being adapted to receive the inner end of the casing 11$^a$, the upper portion of which is cut away as at 84 in order to permit it to clear the worm gear 12 on the free end of the motor shaft which extends within the housing; and formed integrally with the housing 79 and extending outwardly from the opening 83 is a sleeve 85 for supporting the case 11$^a$, the upper portion of said sleeve being notched as at 86 to receive the hopper 87 formed on the grinder case, and hold it from rotation, the housing 79 being provided with a set screw 88 adapted to bear against the casing 11$^a$ of the grinder to secure it against longitudinal movement. In this position of the grinder case, the pinion 13 which is mounted on the counter grinding shaft 11ᵇ of the food grinder, meshes with the worm gear 12 of the main shaft, and by suitably proportioning the worm and pinion the speed of the counter shaft may be reduced to the desired extent. By this gearing connection the rattling and pounding heretofore attending the reduction of speed is eliminated, and at the same time the mechanism is so compact as to be readily housed in a small casing on the motor base. Furthermore, the rotary grinding bur 7 on the end of the main shaft opposite the food grinder may be readily adjusted without affecting the gearing connection. For this purpose an adjusting screw 89 is provided in the end of the housing 79 adapted to bear against the end of the shaft by means of which the bur may be readily adjusted and the coarseness or fineness of the coffee regulated; and similarly an adjusting screw 90 is provided in the inner end of the grinder case adapted to bear against the end of the grinder shaft for regulating the food cutter (not shown).

In order that the motor may be actuated to operate the food grinder when no coffee is being ground, means are provided for maintaining the lever arm 67 from its normal position upon the switch 72, thus enabling the switch to close the circuit. Such means may consist of a rest or support 91 formed from a thin strip of metal pivoted to and held in frictional engagement with the lever arm as by means of a screw 92. The rest is of such length that when swung downward into operative position, it will support the lever arm, and when swung upward into operative position, will be held against the lever arm by its frictional engagement therewith.

I claim:

1. A grinding mill including a hollow base having a receiving chamber therein, grinding means on the base including a bur case, a dust collector on the base, and a separating chamber in the upper portion of the base above the receiving chamber and communicating at one end with the bur case and at its other end with the dust collector.

2. In a grinding mill, means for grinding coffee or the like, and means for separating refuse therefrom including a separating chamber, means for driving a current of air through the separating chamber, and a closed receiving chamber into which the ground coffee falls from the separating chamber, there being a valved outlet in the lower portion of the receiving chamber.

3. In a grinding mill, means for grinding coffee or the like, and means for separating refuse from the ground coffee including a separating chamber having a plurality of perforations and deflectors in its bottom wall, and means for driving a current of air through said separating chamber, the ground coffee falling by gravity through said perforations and the refuse being deflected and carried with the current of air from the separating chamber.

4. A grinding mill including a base having a closed receiving chamber therein, grinding means on the base, a dust collector, a separating chamber in the upper portion of the base communicating with the receiving chamber, the grinding means and dust collector respectively, and means for driving a current of air through the separating chamber into the dust collector.

5. In a grinding mill, means for grinding coffee and separating refuse therefrom including a bur case, a stationary bur and a rotary bur operatively mounted within the case, means for driving the rotary bur including a shaft extending therethrough into the bur case, a separating chamber communicating with the bur case, and a fan wheel on the shaft within the bur case for driving a current of air through the separating chamber, there being a plurality of air inlet openings in the bur case adjacent the shaft.

6. In a grinding mill, means for grinding coffee and separating refuse therefrom including a bur case, a stationary bur and a rotary bur operatively mounted within the case, means for driving the rotary bur including a shaft extending therethrough into the bur case, a separating chamber communicating with the bur case, a plurality of fan blades on the shaft within the bur case for driving a current of air through the separating chamber, there being a plurality of air inlet openings in the bur case adjacent the shaft, and means for collecting refuse from the air current.

7. In a grinding mill, means for grinding coffee or the like including a bur case having a detachable face plate or head, a stationary bur mounted in said head, a rotary bur mounted to coöperate with said stationary bur, and a coffee hopper mounted on the bur case and communicating therewith, there being a coffee outlet in the lower portion of the bur case.

8. In a grinding mill, means for grinding coffee or the like including a bur case having a detachable face plate or head, a stationary bur mounted in said head, a rotary bur mounted to coöperate with the stationary bur and a coffee hopper mounted on the bur case and communicating therewith through the head and stationary bur, there being an opening in the lower portion of the bur case through which the ground coffee is discharged.

9. In a grinding mill, means for grinding coffee or the like including a motor, a switch for controlling the operation of the motor, a grinding element adapted to be operated by said motor, a feed hopper, a valved passageway leading from the feed hopper to the grinding element, and means for actuating the switch to start the motor and for opening the passageway to admit coffee into the grinding element.

10. In a grinding mill, means for grinding coffee or the like, including a bur case, a rotary bur operatively mounted within the case, a stationary bur loosely mounted in the case and adapted to coöperate with the rotary bur, said stationary bur having an opening therein near its center registering with a similar opening in the adjacent wall of the case, a feed hopper mounted on the bur case and communicating therewith through the openings in the stationary bur and the adjacent wall, and a lever arm pivotally mounted in the case and interposed between the stationary bur and the adjacent wall and normally closing the openings therein; whereby when the lever is raised, coffee is admitted between the burs and the pressure exerted thereby against the stationary bur serves to bind the lever arm between it and the adjacent wall of the case during the grinding operation.

11. In a grinding mill, means for grinding coffee or the like including a motor, a switch for controlling the operation of the motor, a grinding element adapted to be operated by said motor, controlling means for actuating the switch and admitting a supply of the coffee to the grinding element, and means for automatically maintaining the controlling means in operative position during the grinding operation and for releasing the controlling means to inoperative position at the completion thereof.

12. In a grinding mill, means for grinding coffee or the like including a bur case, a motor having a shaft extending therethrough into the bur case, a rotary bur on the shaft within the case, a stationary bur loosely mounted in the case and adapted to coöperate with the rotary bur, said stationary bur having an opening therein near its center, registering with a similar opening in the adjacent wall of the case, a feed hopper communicating with the bur case through the openings in the stationary bur and adjacent wall, a lever arm pivotally mounted in the case and interposed between the stationary bur and the adjacent wall and normally closing the openings therein, and a spring switch adapted to be actuated by the raising and lowering of the lever arm, to close and open the motor circuit, the lever arm being adapted to be held in raised position to admit coffee into the bur case during the grinding operation, and to be released to open the motor circuit at the completion thereof.

13. In a grinding mill, means for grinding coffee or the like including a rotary bur and a stationary bur, a motor for driving the rotary bur, a switch for controlling the operation of the motor, controlling means for actuating the switch and admitting a supply of coffee to the grinding element, means for maintaining the controlling means in operative position, and means for automatically releasing the stationary bur when undue pressure exists between the burs and thereby the controlling means to inoperative position.

14. In a grinding mill, means for grinding coffee or the like including a bur case having a face plate or head, a rotary bur operatively mounted within the case, a stationary bur secured in the head, means for admitting coffee between the burs to be ground, and means for automatically releasing the head from the bur case with a movement of separation when undue pressure exists between the burs.

15. In a grinding mill, means for grinding coffee or the like including a bur case having an outer face plate or head, a rotary bur operatively mounted within the case, a stationary bur mounted on the head, means for admitting coffee between the burs to be ground and a movable connection between the bur case and the head for automatically releasing the stationary bur when undue pressure exists between the burs, said connection comprising lugs on one of the parts and slotted ears having inclined outer sides on the other part, and bolts entered through the slots normally engaging the ears at their thicker ends and secured in the lugs, whereby the head may be shifted to an extent equal to the length of the slots and during such shifting movement the head will move outwardly in proportion to the decrease in thickness of the ears.

16. A grinding mill having in combination a base, a motor mounted upon the base having a shaft extending therethrough, and a pair of grinding elements mounted on the base and connected to opposite ends of the shaft.

17. In a grinding mill, a base having a bottom or lower section, an upper section swiveled upon the lower section, and grinding means carried by the upper section.

FRANK E. YOUNG.